July 5, 1927.
N. M. BUTTS, SR
1,634,978
TRAFFIC SIGNAL FOR MOTOR VEHICLES
Filed Feb. 6, 1926     3 Sheets-Sheet 2
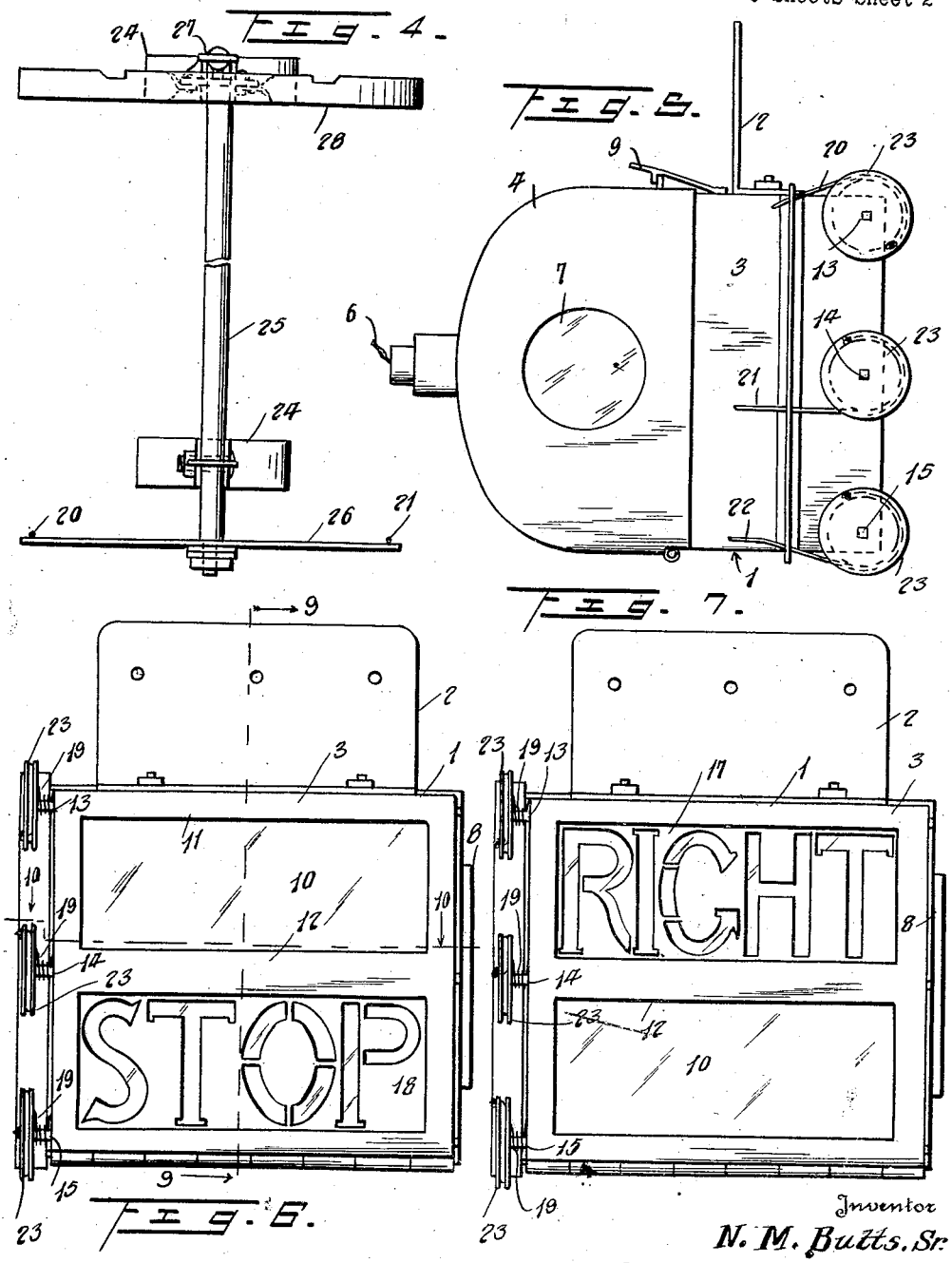
Inventor
N. M. Butts, Sr.

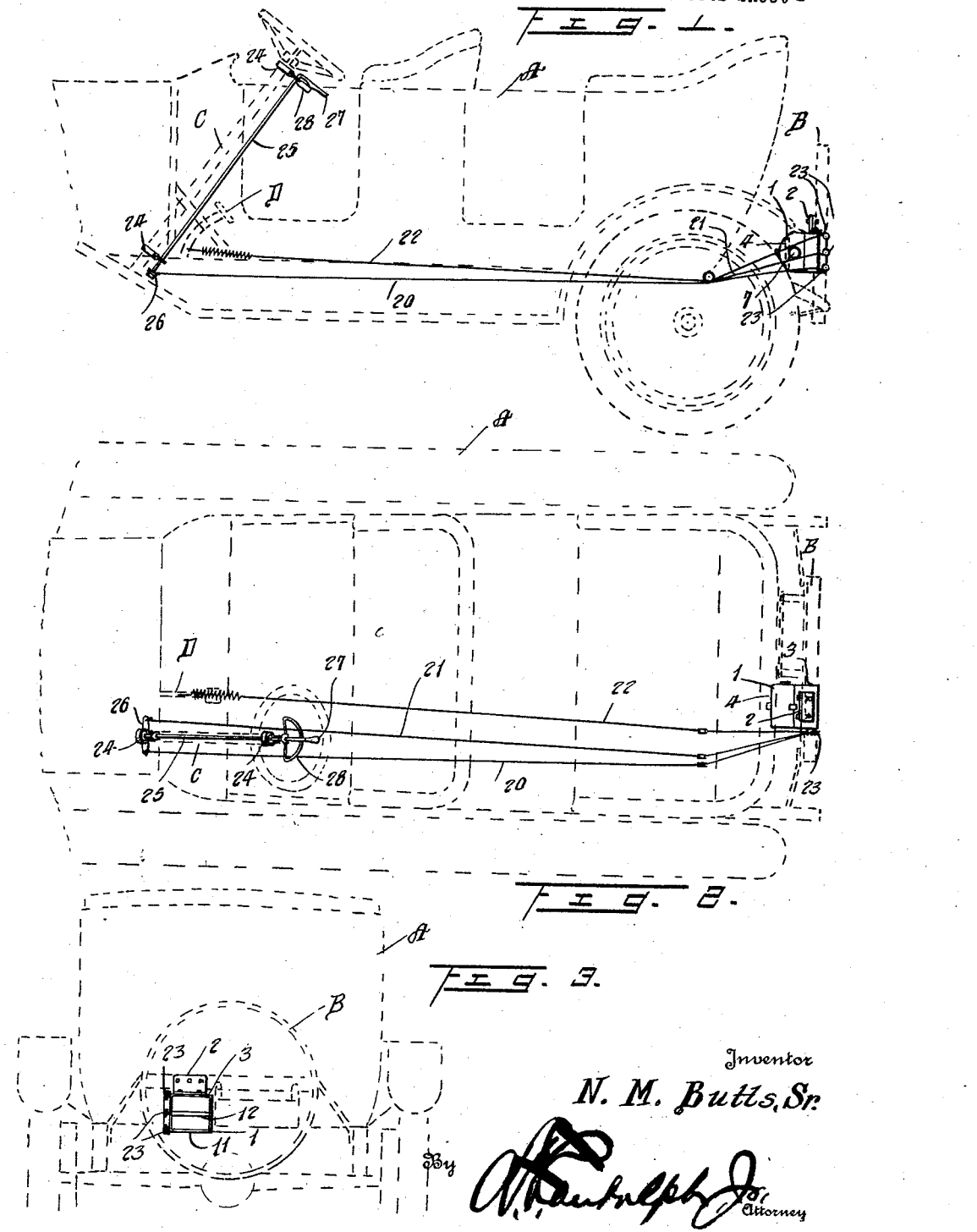

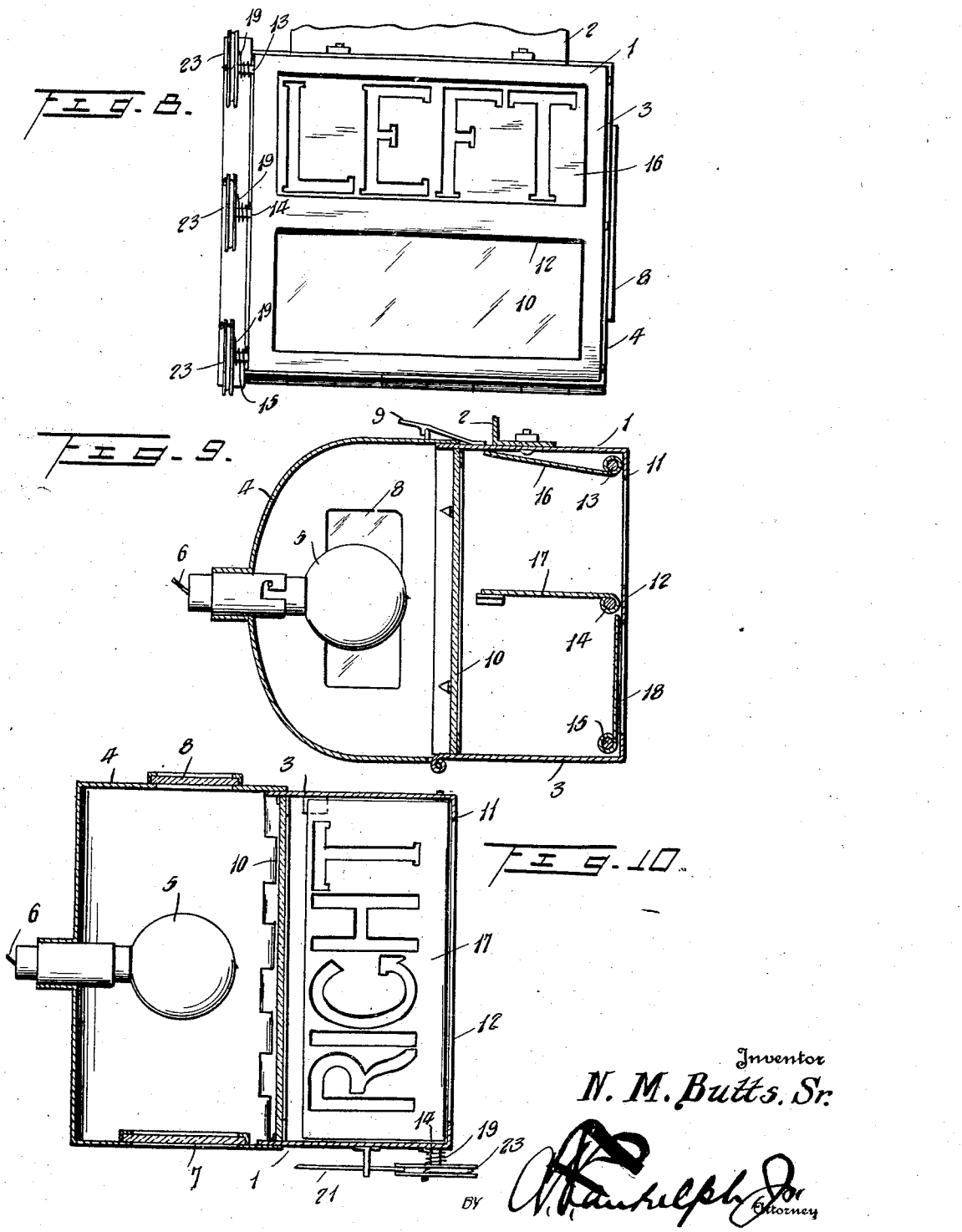

Patented July 5, 1927.

1,634,978

UNITED STATES PATENT OFFICE.

NEWTON M. BUTTS, SR., OF XENIA, OHIO.

TRAFFIC SIGNAL FOR MOTOR VEHICLES.

Application filed February 6, 1926. Serial No. 86,512.

The invention relates to signal devices for motor vehicles controlled by the operator of the vehicle and has for its object the provision of a lamp casing designed to be used for the rear light of the vehicle and provided with means for illuminating the license tag, and also provided with a plurality of shafts each of which carries a panel on which directional indications are displayed, said shafts being held in position normally by means of resilient members to hold the panels in a non-visible position, said shafts being connected with manually operated members by which the operator of the vehicle may rotate the shafts to display the panels and the directional indications thereon, said panels being arranged in position for illumination by the lamp casing.

The invention will be described in detail hereinafter and will be found illustrated in the accompanying drawings, in which Figure 1 is a side view of a motor vehicle in broken lines equipped with the improved traffic signal shown in full lines, Figure 2 a similar top plan view, Figure 3 is a similar rear view, Figure 4 is a view in elevation of the operating mechanism for the turning signals, Figure 5 a side view of the signal casing, Figure 6 is a rear view of the signal members showing the direction panel "Stop" in signaling position, Figure 7 is a similar view showing the direction panel "Right" in signaling position, Figure 8 is a similar view showing the direction signal "Left" in signaling position, Figure 9 is a vertical sectional view on a plane indicated by the line 9—9 of Figure 6, showing the signal panels in non-signaling position, and Figure 10 is a horizontal sectional view on a plane indicated by the line 10—10 of Figure 6, the signal panels being in non-signaling position.

In the drawings similar reference characters will be used to designate corresponding parts throughout the several views.

The improved traffic signal is shown in Figures 1, 2, and 3 as it may be mounted on a motor vehicle, the motor vehicle being, as heretofore stated, shown in broken lines, and indicated generally at A.

The signaling device comprises a housing 1 that is adapted to be secured in any suitable manner to the rear portion of the vehicle A, such for instance as by means of a bracket 2 mounted on the tire carrier B at the rear of the vehicle or in any other selected position. Housing 1 is provided with two portions, a casing that will be designated the signal casing, and indicated at 3, to which the bracket 2 is preferably secured, and a casing 4 hingedly secured to the casing 3, and which will be hereinafter referred to as the lamp casing, and carries an illuminating device which may be an electric lamp 5 such as shown in the drawings, and connected with a suitable source of electric current to wires 6, and the illumination of the lamp may be controlled by a switch (not shown) of any suitable construction, and mounted in any convenient position for actuation by the operator of the vehicle.

The two side walls of the lamp casing 4 have light diffusing panels, the panel 7 showing toward the left of the vehicle being preferably a colored panel such as red or green and is designed to protect the vehicle from collision with vehicles moving through cross streets and roads, while the other panel designated 8 is preferably of clear glass and designed to illuminate a license tag mounted at the side of the lamp casing. 9 indicates a latch of any suitable structure to hold the lamp casing 4 in position behind the signal casing 3, so that the light rays from the lamp 5 are directed through a light diffusing panel 10 suitably mounted in the adjacent portion of the signal casing 3, and said panel 10 is preferably colored red and functions as the rear lamp for the motor vehicle. By this construction of the housing 1 in two casings 3 and 4 respectively, hingedly secured together, and providing means for separation of the lamp casing from the rear light panel 10, so that the lamp casing 4 is open when moved from engagement with the signal casing 3, it will be readily apparent that provision is made for replacement of illuminating means in the lamp casing, and also convenient means provided for replacement of the panel 10 should it become necessary.

The rear end of signal casing 3 is open, or may be provided with a clear glass panel (not shown) if preferred, and the side walls and top and bottom walls of said signal casing having inwardly bent flanges forming a frame for the rear end, said flanges being indicated at 11, and a cross strip 12 divides the opening into two parallel frames in which the direction signals to be hereinafter described are designed to be displayed. By this construction it will be apparent that the light rays directed through the panel 10 will be visible to the rear end of the signal casing 4 at all times, and as heretofore stated, said light panel provides a rear lamp for the motor vehicle.

The direction signals are mounted on shafts 13, 14, and 15 located behind the upper flange 11, the cross strip 12, and the lower flange 11, respectively, and said direction signals comprise panels 16, 17 and 18 carried by said shafts 13, 14 and 15, respectively, said panels being preferably made of sheet metal and having the direction indicating legends cut out of said panels, the panel 16 carrying the legend "Left", the panel 17 the legend "Right", and panel 18 the legend "Stop". The shafts 13, 14 and 15 are held normally in position to hold the panels secured thereto in horizontal or non-visible position, by means of springs 19 secured to said shafts. The signal shafts are adapted to be actuated to move the panels into position visible from the rear of the vehicle by means of flexible elements 20, 21 and 22 connected to said shafts in any suitable manner, the means provided being grooved pulleys 23 fixedly secured to the shafts but it will be apparent that a crank arm or other structure may be substituted therefor.

Carried by the steering post C, by means of brackets 24, is a shaft 25 that has its lower end extended below the floor of the body of the vehicle, and has secured thereto a cross arm 26 having flexible elements 20 secured to one of its extremities, while the flexible element 21 is secured to its other extremity, said flexible elements being carried by any suitable means such for instance as tubes or pulleys intermediate of said cross arm 26 and the shafts 13 and 14. The upper end of the shaft 25 has an operating arm 27 secured thereto and designed for operation by the driver of the vehicle, a notched segment 28 being provided to cooperate with said operating arm 27 to hold said arm temporarily in signaling position.

Flexible element 22 is connected with the brake pedal D of the vehicle so that when the brakes are applied the shaft 15 will be turned to raise panel 18 into visible position to indicate to vehicles in the rear of the motor vehicle A that the vehicle is to slow down or stop. To cushion the action of the stop signal and prevent interference with the functions of the brake pedal, a coil spring 29 is introduced into the flexible element 22.

In operation it will be apparent that when the operating arm 27 is moved toward the right, flexible element 21 will be pulled to rotate shaft 14 and panel 17 will be elevated into a visible position as shown in Figure 7, while a movement of the operating arm 27 toward the left will rotate shaft 13 so that panel 16 will be lowered into the position shown in Figure 8, and when the operating arm is returned to neutral position from either of its extreme positions, the spring 19 on the corresponding shaft will return the panel to its non-visible position. The "Stop" signal is, as heretofore stated, actuated by movement of the brake pedal D to apply the brakes, and the shaft 15 will be rotated to move panel 18 into a visible position, as shown in Figure 6, and the panel will be returned to its non-visible position by means of spring 19 on the shaft 15 when brake pedal D is released.

What is claimed is:—

1. A traffic signal for vehicles comprising a lamp casing, a light diffusing panel in said casing, a signal casing surrounding said panel each of said panels having cut out direction indications therein, and extending outwardly of said lamp casing, shafts journaled in the side walls of the signal casing, each of said shafts carrying a direction indicating panel, means to normally hold said direction indicating panels in inoperative positions substantially perpendicular to the light diffusing panel, a pulley secured to each of said shafts, a flexible member secured to each pulley, and means engaging said flexible members to actuate the shafts and move the direction indicating panels into positions substantially parallel to the light diffusing panel.

2. A traffic signal for vehicles, comprising a lamp casing, a signal casing hingedly engaging the lamp casing, a light diffusing panel carried by said signal casing, shafts journaled in said signal casing, each of said shafts carrying a direction indicating panel, each of said panels having cut out direction indications therein, spring means engaging said shafts to normally hold the panels in inoperative positions substantially perpendicular to the light diffusing panel, and flexible means operatively connected to the shafts to actuate the panels into positions substantially parallel with the light diffusing panel.

In testimony whereof I affix my signature.

NEWTON M. BUTTS, Sr.